J. C. WOODFORD
AIR SERVICE STATION
March 31, 1931. Re. 18,016
Original Filed July 5, 1927 4 Sheets-Sheet 1
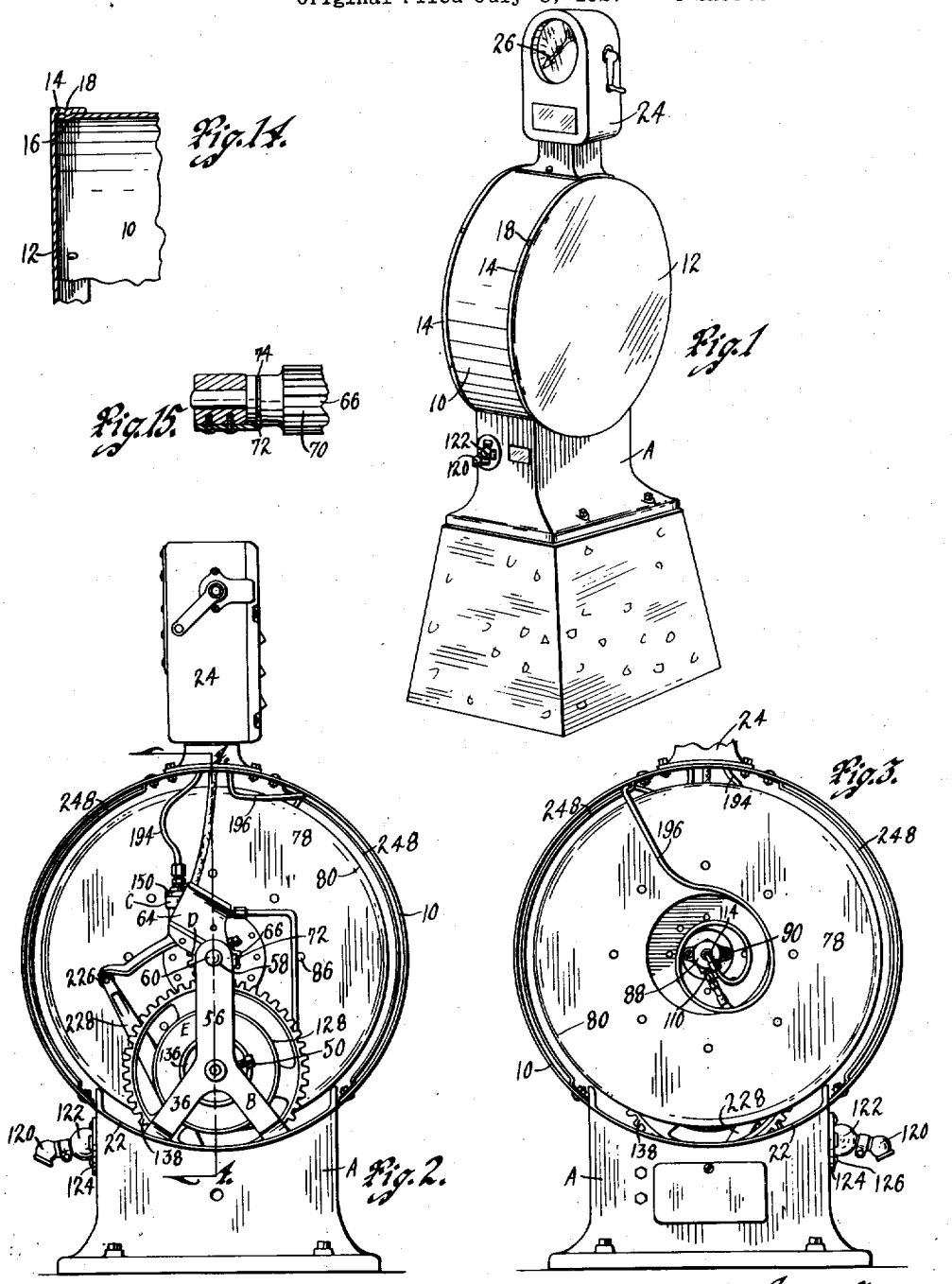
Witness
L. F. Sandberg
Inventor
Joe C. Woodford
By Bair & Freeman Attorneys

J. C. WOODFORD

AIR SERVICE STATION

March 31, 1931. Re. 18,016

Original Filed July 5, 1927 4 Sheets-Sheet 2

Witness
L. F. Sandberg

Inventor
Joe C. Woodford
by Bair & Freeman Attorneys

J. C. WOODFORD
AIR SERVICE STATION
March 31, 1931. Re. 18,016
Original Filed July 5, 1927 4 Sheets-Sheet 3
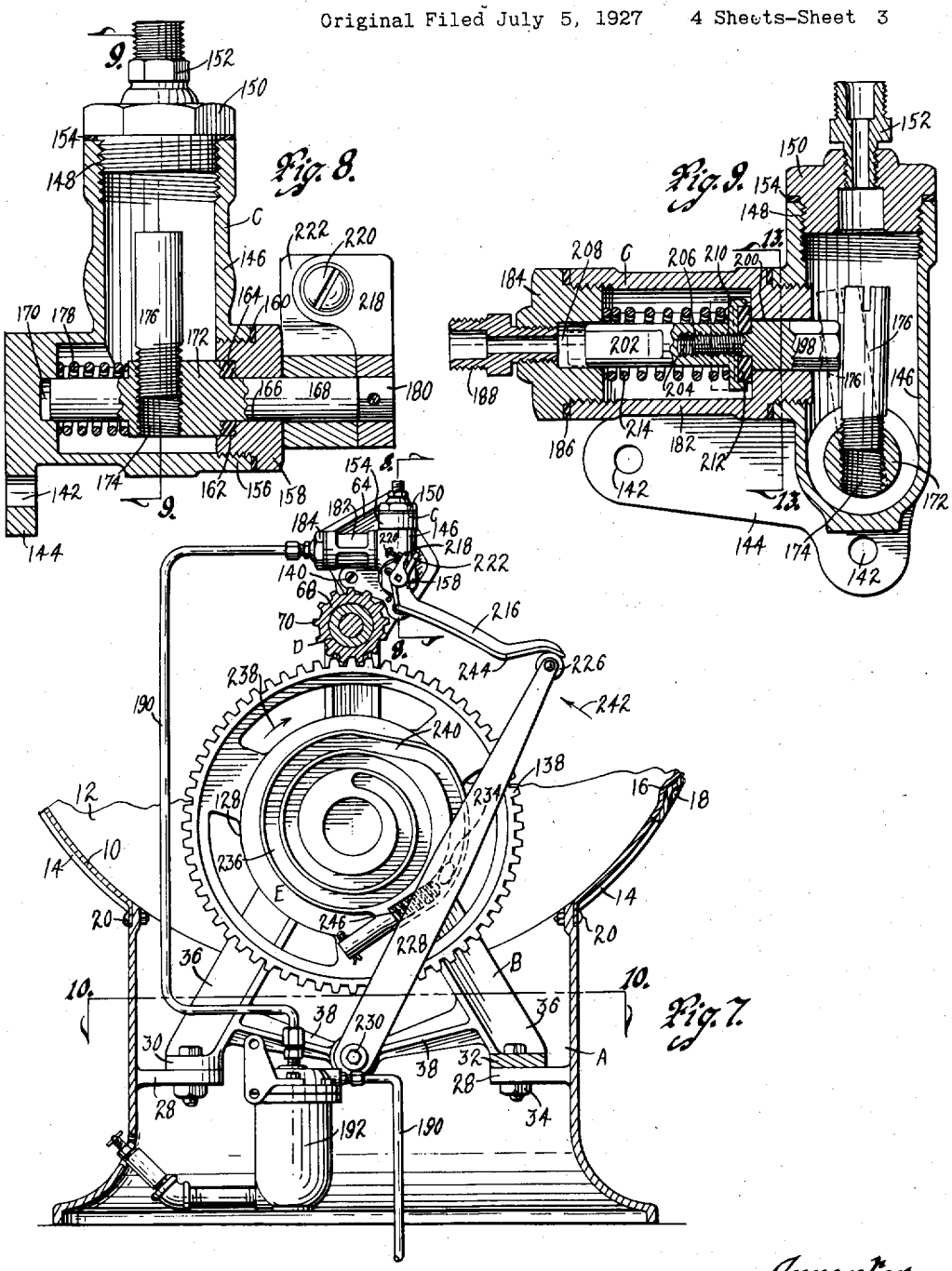
Witness
L. F. Sandberg
Inventor
Joe C. Woodford
By Bair & Freeman Attorneys

J. C. WOODFORD

AIR SERVICE STATION

March 31, 1931. Re. 18,016

Original Filed July 5, 1927 4 Sheets-Sheet 4

Witness
L. F. Sandberg

Inventor
Joe C. Woodford
by Bair & Freeman
Attorneys

Reissued Mar. 31, 1931

Re. 18,016

UNITED STATES PATENT OFFICE

JOE C. WOODFORD, OF ARDMORE, PENNSYLVANIA, ASSIGNOR TO SERVICE STATION EQUIPMENT COMPANY, OF BRYAN, OHIO, A CORPORATION OF DELAWARE

AIR-SERVICE STATION

Original No. 1,752,048, dated March 25, 1930, Serial No. 203,301, filed July 5, 1927. Application for reissue filed November 14, 1930. Serial No. 495,739.

My invention may be advantageously embodied in apparatus for inflating vehicle tires and including a reel, carrying hose through which the air may be dispensed. As hereinafter described, such apparatus may include a valve adapted to be automatically opened to dispense air through the hose when the latter is partly withdrawn from the reel, and to be automatically closed to stop the supply of air by the return of the hose upon the reel after a dispensing operation.

In the form of my invention chosen for illustration, the air is supplied to the hose which turns with the reel, through a conduit at the axis of the reel, necessitating coupling means which shall remain airtight at the joint between said hose and conduit. It is extremely difficult to maintain such joints airtight under the constant wear and stress of operation of the reel. Therefore, an advantgeous feature of my invention is the provision of air conducting means which will resiliently yield and permit said joint to gyrate and thus avoid such stresses thereon as to cause it to leak.

As hereinafter described, such yielding air conductor may have one end fixed in connection with the source of compressed air and the other end extending spirally to the axis of the reel.

My invention includes the various novel features of construction and arrangement hereinafter more definitely specified.

In said drawings; Fig. 1 is a perspective view of an air serving station embodying my invention in a casing mounted upon a stationary base pedestal.

Fig. 2 is a side elevation of said casing with one of the cover plates removed.

Fig. 3 is a fragmentary elevation of the opposite side of said casing with one of the cover plates removed.

Fig. 7 is a fragmentary sectional view taken on the line 7—7 in Fig. 4, with parts in elevation.

Fig. 8 is a sectional view taken on the line 8—8 in Fig. 7, disclosing a portion of said valve.

Fig. 9 is a sectional view taken on the line 9—9 in Fig. 8.

Fig. 14 is a fragmentary radial sectional view of a portion of said casing and its cover plate.

Fig. 15 is a fragmentary partly sectional view showing the connection of the hose reel hub with the bracket upon which it is mounted.

Figure 4:
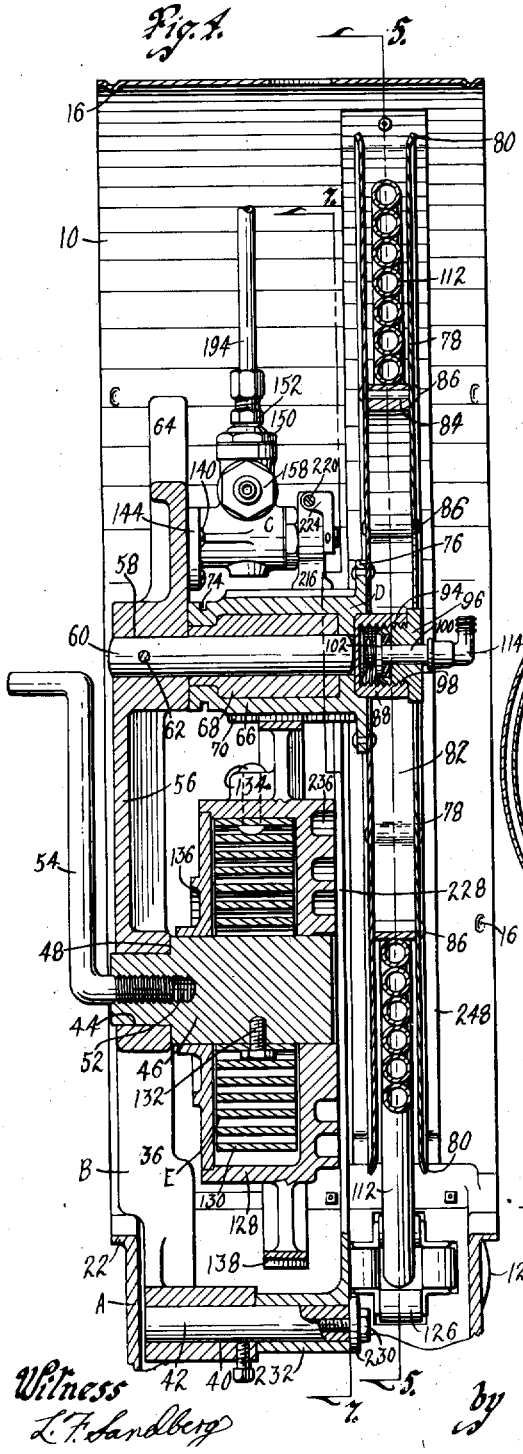
Fig. 4 is a fragmentary vertical sectional view taken on the line 4—4 in Fig. 2, but on a larger scale.

In said drawings; the frame A is a rectangular housing, preferably a casting, forming the lower part of the casing, the upper cylindriform portion of which is formed of sheet metal 10 and substantially drum shaped, having opposite end cover plates 12 with inwardly turned peripheral flanges 14. Indents 16 along the edges of said casing 10 are adapted to detachably engage projections 18 formed upon said flanges 14; so that said cover plates 12 may be snapped on and off said casing 10. Said casing member 10 is rigidly connected with the base A by bolts 20, as indicated in Fig. 7.

As indicated in Figs. 2 and 3; said frame A has at its axially opposite sides, outwardly projecting flanges 22 bridging the spaces between the ends of the casing 10 and in arcuate continuation thereof so that said flanges 14 or the cover plates 12 may extend over said flanges 22 as if they were part of said casing 10.

The housing 24 which is mounted upon the top of said casing 10, as shown in Figs. 1 and 2, holds mechanism including a rotary hand 26 which is adapted to be set with reference to the arcuate scale of graduations indicated in Fig. 1, by the manually operative crank handle there shown projecting from said housing 24; so as to indicate and determine in pounds the pressure of air desired to be dispensed and permitted to pass through said device into the inner tube of an automobile tire. However, such pressure controlling means forms no part of my present invention.

Figure 10:
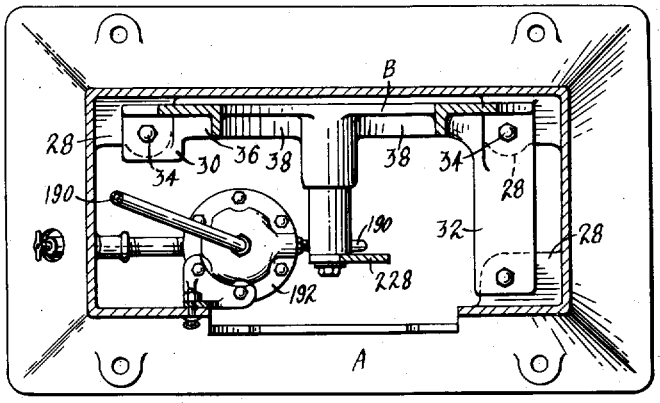
Fig. 10 is a plan sectional view taken on the line 10—10 in Fig. 7.
Figure 11:
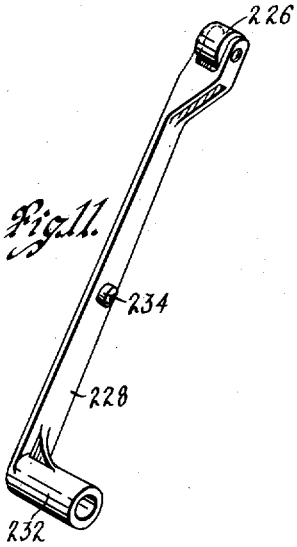
Fig. 11 is a perspective view of the operating lever of the valve automatically controlling the dispensation of air as aforesaid.

Said frame A has inwardly extending lugs 28 supporting the inverted Y-shaped bracket B. As indicated in Fig. 10, said bracket B has a short foot flange 30 resting upon one of said lugs 28 and a longer foot flange 32 resting upon two other lugs 28, and is rigidly connected thereto by bolts 34.

The lower arms 36 of said Y-shaped bracket B are connected by the bridge 38 carrying the bearing 40 wherein the stud shaft 42 is rigidly secured, as indicated in Fig. 4.

At the junction of said arms 36, said bracket B is provided with the bearing 44, shown in Fig. 4, for the reduced end of the shaft 46 which has the shoulder 48 bearing against said bracket. Said shaft 46 is normally held stationary in said bracket bearing 44 by the set screw 50 shown in Fig. 2, but has the screw threaded socket 52 to receive the axial end of the crank 54, shown in Fig. 4, so that said shaft, which is the arbor of the spring by which the dispensing hose is normally wound upon the reel, may be turned to wind said spring.

Said bracket B has the member 56 extending upwardly from the junction of said arms 36, as indicated in Fig. 2, and provided with the bearing 58 for the shaft 60 which is detachably rigidly secured therein by the pin 62 and adapted to support the reel hub structure D, as shown in Fig. 4. The portion 64 of said bracket B extending above said bearing 58, as shown in Fig. 4, supports the automatically operative air controlling valve structure C hereinafter described.

As indicated in Fig. 4, the reel hub D comprises a tubular sleeve containing the Babbitt bearing 68 fitted to said shaft 60, and said sleeve is provided with the gear teeth 70 shown in Figs. 4 and 7. Said reel structure is detained against axial movement on said shaft 60 by the finger 72 fixed to the bracket B and engaged in the annular groove 74 in said sleeve 66, as shown in Fig. 15; but said reel structure may be freely rotated on said shaft as hereinafter described.

Figure 5:
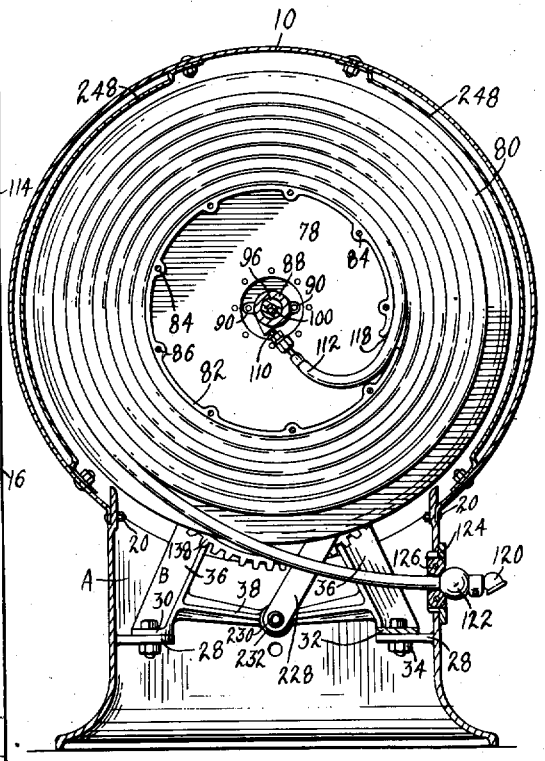
Fig. 5 is a sectional view taken on the line 5—5 in Fig. 4 but on a smaller scale.

As shown in Fig. 4; said sleeve 66 has the annular flange 76 rigidly connected with one of the two annular sheet metal plates 78, which have their outer edges outwardly turned as indicated at 80. Said two plates 78 are spaced apart by the split spacing ring 82 which has openings 84 through which are extended rivets 86 which rigidly connect said plates with said ring. As shown in Fig. 5, said ring is of spiral configuration and supports the air service hose 112 which is normally wound thereon, as shown in Figs. 4 and 5, with the inner end extending through the gap 118 in said ring 82 and in connection with the fitting 110 projecting from the rotary casing 88, which is carried by said reel. The outer end of said hose 112 is provided with the usual check valve coupling 120 adapted to engage the valve stem of an automobile inner tire tube to dispense air into the latter, and said hose is preferably provided with the rubber ring 122 for contact with the side of the casing base A, which has the fitting 124 with four anti-friction rollers 126 mounted therein to permit said hose to be pulled between them in any direction with the minimum amount of frictional resistance at said casing A.

Figure 6:
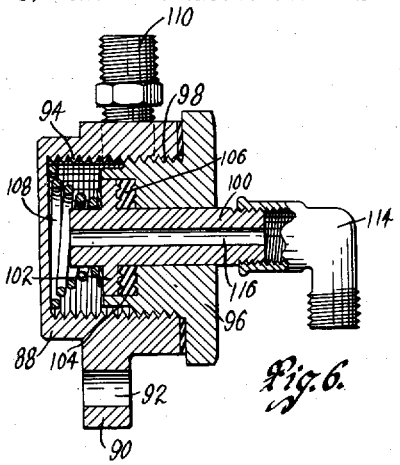
Fig. 6 is a diametrical sectional view, partly in elevation, of the coupling between the hose and the supply conduit.

As shown in Figs. 4 and 6; the air supply conduit is connected to the hose reel by means including said casing 88 which is seated in a recess in the right hand end of the hub D as shown in Fig. 4, and has lugs 90, indicated in Figs. 3, 5, and 6, which are bolted or riveted to said flange 76 of the reel hub D. As shown in Figs. 4 and 6, said casing 88 is screw threaded at 94 to receive the plug 96 which has screw threads 98 engaged therewith, and the arrangement is such that said casing 88 and plug 96 rotate with the reel. Compressed air is supplied through said casing 88 by way of the non-revoluble axial tubular stem 100 which is journaled in said plug 96 and has the annular flange 102 fitted in the cup shaped recess 104 in said plug against the gasket 106, formed of material adapted to render the joint air-tight under pressure of the spring 108 which, as shown in Fig. 6, bears at one end against the left hand side of said casing 88 and at the other end against said flange 102.

Said axial stem 100 has the elbow 114 at its outer end in communication with the air passageway 116 therethrough and said elbow is connected with the inner end of the flexible metallic resilient air supply conduit 196, conveniently formed of flexible copper tubing, shown in Fig. 3 which, as there shown, may be spirally curved at its inner end connected with said elbow 114 at the axis of the reel, to permit such gyration of the reel axis as is produced by continued use and wear, without permitting any air leak past said gasket 106. The outer end of said flexible air conduit 196 may be rigidly secured in the casing 24, as hereinafter described.

When said hose is released by the operator, it is adapted to be automatically rewound upon the reel by the spring actuated device E shown in Figs. 2, 4, and 7. As shown in Fig. 4, said device includes the rotary casing 128 and its cover plate 136, both journaled upon said shaft 46, and inclosing the spiral spring 130, which is connected at its inner end to said shaft 46, by the screw 132, and connected at its outer end to its casing 128 by the rivet 134.

Said spring casing 128 forms the hub of the gear 138 which meshes with the teeth 70 on said reel hub D, as shown in Fig. 7. Consequently, when the hose 112 is withdrawn from said reel, said gear teeth 70 turn said gear 138 to wind up the spring 130, the tension of which may be adjustably varied, as above noted, by releasing said set screw 50 and turning said shaft 46 by the crank 54. Said spring is maintained so adjusted that its stress is sufficient to turn the reel and wind the hose thereon to the position shown in Fig. 5, whenever the hose is released by the operator. Said crank 54 is normally removed so that that side of the casing 10 may be closed by its removable cover plate 12.

Referring to Figs. 7 to 10 inclusive; the air controlling valve casing C is rigidly secured upon the upper arm extension 64 of the bracket B, conveniently by bolts 140 which extend through openings 142 in the flange 144 of said valve casing. As best shown in Fig. 9, said casing C includes the tubular shaped portion 146 having the screw threaded opening 148 in its upper end engaging the plug 150 carrying the air conduit fitting 152; the joint between said casing and plug being rendered air-tight by the gasket 154. As shown in Fig. 2, the air conduit 194, which is connected with said fitting 152, extends from said casing C to the housing fixture 24 in which said air pressure regulating mechanism 26 is mounted. Air is supplied through said housing 24 from said conduit 194 to said flexible conduit 196, the upper end of which is fixed, with respect to said casing 10 and housing 24, as indicated in Fig. 2, but the lower end of which is connected to said elbow 114, at the reel axis, as shown in Fig. 3.

As shown in Fig. 8, said tubular member 146 of the valve casing C is also provided with the screw threaded opening 156 for the plug 158; the joint between them being rendered air-tight by the gasket 160. Said plug 158 has the cup-shaped recess 162 at its inner end holding the gasket 164, sealing the joint between the bearing 166 and the valve opening and closing shaft 168, journaled therein. The inner end of said shaft 168 is journaled in the bearing 170 in said valve casing C. Said shaft 168 has the enlargement 172 with the screw socket 174 in which the valve tappet pin 176 is mounted in rigid relation with said shaft and in registry with the valve stem 198, as shown in Fig. 9. The spring 178 shown in Fig. 8, encircling said shaft 168, presses the enlargement 172 of the latter against said gasket 164 to make the joint between said shaft and plug 158 air-tight.

Figure 12:
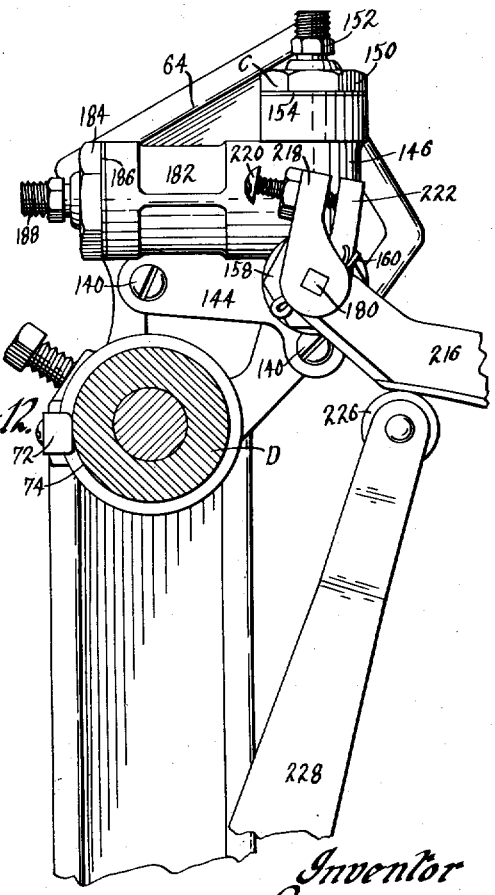
Fig. 12 is an elevation of said valve similar to Fig. 7, but in a different position and including a fragmentary section of its support.
Figure 13:
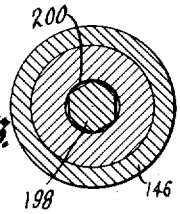
Fig. 13 is a sectional view taken on the line 13—13 in Fig. 9.

The outer end of said shaft 168 is square, as indicated at 180 in Fig. 8, and carries, in rigid connection therewith, the crank arm 218 which has the screw 220 adjustably mounted therein, as indicated in Figs. 7 and 12, and adapted to be encountered by the short arm 222 of the valve actuating cam arm 216 which is automatically operated as hereinafter described.

As shown in Fig. 9; said air control valve casing C carries the sleeve 182 connected therewith by its screw threaded neck, having a gasket sealing the joint between them. The outer end of said sleeve 182 is closed by the screw plug 184 and sealed by the gasket 186. The air conduit fitting 188 in said plug 184 is provided with the conduit 190 shown in Fig. 7, thru which air is supplied to said hose thru the air cleaner and sediment trap 192, which is conveniently of the kind disclosed in my copending application Serial No. 195,234 filed May 31, 1927.

The flow of air from said supply conduit 190 thru the sleeve 182 shown in Fig. 9, by way of the passage 200 leading to said fitting 152 and conduit 194, is controlled by the valve 212 which is pressed toward its seat at the right hand end of said sleeve 182 by the spring 214 to normally close it, as shown in Fig. 9, but is adapted to be opened by rocking movement of said shaft 168 and its pin 176. Said valve is held between the stems 198 and 202 which are connected by the screw threads 204 and 206, as shown in Fig. 9, and said stems are flattened on the sides to permit the passage of air thru the openings 200 and 208.

Said valve operating shaft 168 is adapted to be rocked with the valve tappet pin 176 from the position shown in full lines to the position shown in dotted lines in Fig. 9, by the cam arm 216 which, as shown in Figs. 7 and 12, is continually maintained in cooperative relation with the roller 226 on the valve operating lever 228 which is held by the screw 230, shown in Fig. 4, on the stationary stud shaft 42 which forms the fulcrum for said lever. Said lever 228 is adapted to be oscillated by its lug 234 which projects therefrom into the spiral groove 236 formed in one wall of the drum casing 128 as shown in Figs. 4 and 7.

Fig. 7 shows said lever 228 in the position in which said valve 212 is closed, as shown in Fig. 9, and Fig. 12 shows said lever in the position in which said valve is opened by movement of said lever 228 in the direction of the arrow 242 shown in Fig. 7 which causes said roller 226 to shift said valve operating arm 216 by the cam 244 on the latter.

When the air service hose 112 is withdrawn from its reel D, the latter rotates counterclockwise in Fig. 7, with the effect of turning the spring drum by its gear 138, in the direction of the arrow 238 in said figure and, when the lug 234 on said lever reaches the cam portion 240 of said groove 236, said lever is swung in the direction indicated by the arrow 242 to open said valve 212, only after said hose is partly withdrawn from said reel. However, said valve then remains open so long as the hose is withdrawn; the lever 228 being moved further to the left in Fig. 7 by the engagement of its lug 234 in the spiral channel 236 but without effect upon the lever 216 except to continue to support it with the valve in open position.

When said air service hose 112 is released by the operator, it is rewound upon said reel, as shown in Fig. 5, by the stress of said spring 130, and I prefer to stop its rotation by the shock absorber comprising the spring 246 which is placed in the groove 236 as shown in Fig. 7, in position to encounter the lug 234 on said lever 228 and thus limit the stress upon said hose and the buffer ring 122 shown in Fig. 5.

I find it convenient to provide said casing 10 with guard rails 248 in oposition to the edges of the reel plates 78, to prevent the hose from leaving the reel when suddenly released.

It may be observed that the construction and arrangement above described are such that all of the movable elements of my improved air service station may be completely assembled on said bracket 36, independently of the casing A and 10, so that it may be inserted and removed as a unit with respect to said casing, and be tested, repaired, and utilized independently of said casing as distinguished from the structures of the prior art, wherein the reel for the air service hose and the valve for automatically controlling the supply of air thereto are independently supported by different parts of an outer casing and not removable therefrom in cooperative relation. Such use of the outer casing to hold the parts of an air service station in proper coordinate relation, imposes cost of original construction and subsequent repairs which are obviated by the removable unit construction characteristic of my invention.

Therefore, I do not desire to limit myself to the precise details of construction and arrangement herein set forth, as it is obvious that various modifications may be made therein without departing from the essential features of my invention, as defined in the appended claims.

I claim:

1. In an air service station, the combination with an outer casing; of a hose reel rotatably mounted in said casing; and air service hose wound on said reel; a metallic air service conduit leading to said hose and including an air tight connection at the axis of said reel; a portion of said conduit being flexible and spirally wound around and extending from the axis of said reel to a stationary fixture on said casing; whereby rupture of said connection by movement thereof relative to the air service conduit is precluded.

2. In an air service station, the combination with an outer casing; of a hose reel rotatably mounted in said casing; an air service hose wound on said reel; a metallic air service conduit leading to said hose and including a rotary air tight connection at the axis of said reel; a portion of said conduit being flexible and spirally wound around and extending from the axis of said reel to a stationary fixture on said casing; whereby rupture of said connection by movement thereof relative to the air service conduit is precluded.

3. In an air service station, the combination with an outer casing; of a hose reel rotatably mounted in said casing; an air service hose wound on said reel; an air service conduit leading to said hose and including a rotary air tight connection at the axis of said reel; a portion of said conduit being a curved metallic tube which is flexible and is spirally wound around and extends from the axis of said reel to a stationary fixture on said casing; whereby rupture of said connection by rotary movement thereof relative to the air service conduit is precluded.

4. In an air service station, the combination with an outer casing; of a bracket in said casing; a stud shaft fixed at one end in said bracket; a reel mounted to rotate on the free end of said stud shaft and carrying a tubular casing; an air service hose wound on said reel, having its inner end connected with said tubular casing; and a metallic air service conduit leading to said hose and including a non-revoluble portion in coaxial engagement with said tubular casing and forming an air tight connection therewith; said conduit including a spirally wound flexible portion extending from and disposed around the axis of said reel to a stationary fixture which is rigidly connected with said bracket; whereby rupture of said connection by rotary movement of said reel is precluded.

5. In an air service station, the combination with a bracket; of a stud shaft fixed at one end in said bracket; a reel mounted to rotate on the free end of said stud shaft and carrying a tubular casing in coaxial relation therewith an air service hose wound on said reel, having its inner end connected with said tubular casing; and a metallic air service conduit leading to said hose and including a rigid portion in coaxial engagement with said tubular casing and forming an air tight connection therewith; said conduit including a spirally wound flexible portion extending from and disposed around the axis of said reel to a stationary fixture; whereby rupture of said connection by gyratory movement thereof with said coaxial portion of the air service conduit is precluded.

6. In an air service station, the combination with an outer casing having inwardly extending bracket supports, in spaced relation; of a bracket separable from said casing but comprising three radial arms, two of which are adapted for rigid connection with said supports; three stud shafts having means adapted to rigidly connect each of them at one end in said bracket, with their axes in a common medial plane in said bracket; a spring drum journaled upon the intermediate one of said shafts; a hose reel journaled upon another one of said shafts and adapted to turn said drum; a valve operating lever fulcrumed on the third one of said shafts; means carried by said drum, adapted to oscillate said lever as the drum is turned; an air service hose wound on said reel; a valve fixed on said bracket, independently of said outer casing, but in cooperative relation with said lever, and adapted to control the supply of air to said hose, independently of said outer casing; whereby all of the movable elements of the combination may be completely assembled on said bracket, independently of said casing, and inserted and removed, as a unit, with respect to said casing, and be tested, repaired and utilized independently of said casing.

7. Apparatus as in claim 6; wherein the bracket is Y-shaped, the shaft for the drum is located at the junction of its three radially extending arms, and both said reel supporting shaft and said valve are secured upon one arm thereof, remote from said junction, and valve fulcrum shaft; whereby said valve, its lever, and the means for actuating the latter, are maintained in cooperative relation, independently of said outer casing.

8. A fluid service station including a bracket, a hose reel revolubly mounted thereon, a fluid service hose wound on said reel, a fluid service line having a fluid tight connection with said hose at the center of the reel, a portion of said fluid service line being metallic tubing and being spirally arranged around such fluid tight connection whereby to preclude the rupturing of the connection upon movement of the connection relative to the fluid service line.

9. A fluid service station comprising a housing, a reel therein, a fluid service hose wound thereon, a metallic fluid service line connected with said hose, said fluid service line being spirally arranged at and around the point of its connection with the fluid service hose.

In testimony whereof, I have hereunto signed my name at Conshohocken, Pennsylvania, this twenty-eighth day of October, 1930.

JOE C. WOODFORD.